United States Patent [19]

Åsbrink

[11] Patent Number: 4,704,602

[45] Date of Patent: Nov. 3, 1987

[54] METHOD AND SYSTEM FOR DETECTING AN INDICATING DEVICE

[75] Inventor: Leif Åsbrink, Vingåker, Sweden

[73] Assignee: Intermodulation and Safety System AB, Sweden

[21] Appl. No.: 787,789

[22] PCT Filed: Feb. 5, 1985

[86] PCT No.: PCT/SE85/00054

§ 371 Date: Oct. 1, 1985

§ 102(e) Date: Oct. 1, 1985

[87] PCT Pub. No.: WO85/03792

PCT Pub. Date: Aug. 29, 1985

[30] Foreign Application Priority Data

Feb. 15, 1984 [SE] Sweden .................... 8400826
Sep. 19, 1984 [SE] Sweden .................... 8404691

[51] Int. Cl.⁴ .................................................. G08B 13/18
[52] U.S. Cl. .................................. 340/551; 340/572
[58] Field of Search ................................ 340/551, 572

[56] References Cited

U.S. PATENT DOCUMENTS

| | | | |
|---|---|---|---|
| 3,707,711 | 12/1972 | Cole et al. | 340/577 |
| 4,139,844 | 2/1979 | Reeder | 340/572 |
| 4,249,167 | 2/1981 | Purinton et al. | 340/572 |
| 4,308,530 | 12/1981 | Kip et al. | 340/572 |
| 4,352,098 | 9/1982 | Stephen et al. | 340/572 |
| 4,471,344 | 9/1984 | Williams | 340/572 |

Primary Examiner—Glen R. Swann, III
Attorney, Agent, or Firm—Silverman, Cass, Singer & Winburn, Ltd.

[57] ABSTRACT

An indicating device (31) of a highly permeable material is detected by emitting and receiving a magnetic field, wherein two coils (1,2) are caused to emit a high-frequency magnetic alternating field, and a first one of the coils (1) emits an alternating field with a frequency ($f_1$) different from the frequence ($f_2$) of the field emitted by the second one of the coils (2), and at least one difference and/or sum frequency $n \cdot f_1 + m \cdot f_2$ occurring by intermodulation by means of the indicating device (31), where n and m are positive or negative integers, is caused to be received by one or several coils (9). A third low-frequency magnetic alternating field is caused to be emitted in said zone with a frequency ($f_3$) substantially lower than the frequencies ($f_1,f_2$), which low-frequency field has a field intensity sufficiently high, independently of the fields with the frequencies $f_1$ and $f_2$ to put the indicating device (31) into a saturated condition in step with the frequency of the low-frequency field. A field re-emitted from the indicating device (31) therefore is detected by means of a detector device as an intermodulation between frequencies $f_1$ and $f_2$ occurring periodically with the frequency of the low-frequency field.

14 Claims, 5 Drawing Figures

4,704,602

METHOD AND SYSTEM FOR DETECTING AN INDICATING DEVICE

BACKGROUND OF THE INVENTION

This invention relates to a method of detecting an indicating device in a restricted zone of investigation and to a system for carrying out the method.

The invention is intended to be used primarily for goods monitoring in the trade, especially in the everyday commodities trade, but can be used also for indication of other kind, for example for indicating persons.

In Swedish patent application No. 8400826-7, a system for detecting the presence of indicating devices is described which have the form, for example, of a narrow and thin, but relatively long strip of a highly permeable material, such as being commercially available under the name Permalloy. The presence of such strips is detected by means of coils, which emit and receive magnetic fields, and by means of devices for the detection of signals received.

When such a strip is exposed to a relatively weak external magnetic field, it assumes in its longitudinal direction a magnetic flux density, the magnitude of which can be twenty thousand times higher than in the external magnetic field. The presence of such strips is detected by a detector device, in which variations in voltage induced in a receiver coil are detected.

According to said patent, two coils are caused to emit a magnetic alternating field, where a first one of the coils emits an alternating field with a frequency ($f_1$), which is different from the frequency ($f_2$) of the field emitted by the second one of the coils. Difference and sum frequencies $n \cdot f_1 + m \cdot f_2$ arising by intermodulation by the indicating device, where n and m are positive or negative integers, are received by one or several coils, whereafter the signal thus received is signal processed in a detector device for determining whether or not there is intermodulation, i.e. whether there is or is not an indicating device in the monitoring zone. The said intermodulation is caused by non-linear magnetic properties of the indicating device.

In practice, however, even objects made of iron, for example trolleys, tins etc., which normally are present in the investigation zone, give rise to intermodulation. Interferences by other magnetic fields and iron objects also can result in, that signals received at the detection are interpreted as the detection of an indicating device.

A tin, for example, located close by a coil emitting a high-frequency signal, by intermodulation can give rise to a signal received, the characteristics of which correspond to a signal from a strip of highly permeable material located for away from said coil.

For this reason it is necessary, for example, that intermodulation products of different order must be detected in order to distinguish if a signal received originated from an indicating device in the form of a strip or from another object in the investigation zone.

It is a desire of extreme importance to prevent such monitoring systems from sounding alarm caused by objects other than special indicating devices.

SUMMARY OF THE INVENTION

The present invention relates to a method and a system, by which magnetic fields are caused to be emitted which give rise to a signal received, which easily can be analysed to distinguish an indicating device from another object present in the investigation zone.

The present invention, thus, provides a method and a system by which the probability of such false alarms in respect of objects, which normally can be present in the investigation zone, is substantially eliminated.

The present invention, thus, relates to a method of detecting the presence of an indicating device in a restricted investigation zone, comprising the steps of detecting an indicating device of a highly permeable material by emitting and receiving a magnetic field, where two coils are caused to emit a high-frequency magnetic alternating field, where a first one of said coils emits an alternating field with a frequency ($f_1$), which differs from the frequency ($f_2$) of the field emitted by the second one of said coils, and where at least one difference and/or sum frequency $n \cdot f_1 + m \cdot f_2$ occurring by intermodulation by the indicating device, where n and m are positive or negative integers, is caused to be received by one or several coils. The method is characterized in that a third magnetic alternating field of low frequency is caused to be emitted in said zone, which field has a frequency ($f_3$) substantially lower than said frequencies ($f_1,f_2$) and is caused to have a field intensity sufficiently high for, independently of the fields with the frequencies $f_1$ and $f_2$, putting the indicating device into saturated condition in step with the frequency of the low-frequency field, and that a field re-emitted from the indicating device is caused to be detected by a detector device as an intermodulation, occurring periodically with the frequency of the low-frequency field, between the frequencies $f_1$ and $f_2$.

The invention further relates to a system for detecting the presence of an indicating device in a restricted monitoring zone, comprising coils and associated feeding equipment for emitting and receiving magnetic alternating fields in order thereby to detect an indicating device of a preferably highly permeable material, where two coils are provided, one first of which is capable to emit a high-frequency alternating field with a frequency ($f_1$), and a second one of said coils is capable to emit a high-frequency alternating field with a frequency ($f_2$) different from said firstmentioned frequency, and a detector device is provided comprising a receiver coil and capable to detect the occurrence of at least one difference or sum frequency $n \cdot f_1 + m \cdot f_2$ where n and m are positive or negative integers, which are formed by intermodulation by means of said indicating device. The system is characterized in that the feed equipment comprises means for emitting a third alternating field, which has low frequency with a frequency ($f_3$) substantially lower than said frequencies ($f_1,f_2$), which means are capable to emit the low-frequency field with a field intensity sufficiently high for, independently of the fields with the frequencies $f_1$ and $f_2$, putting the indicating device into saturated condition in step with the frequency ($f_3$) of the low-frequency field, and that the detector device is capable by means of a receiver coil to receive and thereby to detect a field re-emitted by the indicating device, which field includes an intermodulation, occurring periodically with the frequency ($f_3$) of the low-frequency field, between the frequencies $f_1$ and $f_2$, and at the occurrence of such a periodical intermodulation to emit a signal to an alarm device.

One problem solved by the aforementioned patent is, that the investigation zone clearly can be restricted as regards its geographic extension. This is essential in that it prevents the sounding of alarm by an indicating device or other object located outside the investigation zone in question which, for example, can be a passage between two adjacent cash desks. This restriction is effected in that a coil is located on each side of the investigation zone, and each of the coils emits a magnetic field with one of two different frequencies.

When the two outer fields are generated each by a coil located on both sides of the investigation zone, the product of the field intensities has a high value centrally between the coils, which value decreases steeply outside the coils. The intensity of the intermodulation products emitted by the indicating device, broadly seen, is a measure of the product of the field intensity for the two outer alternating fields. This implies, that said personal space can be an investigation zone where one coil is located on each side of the personal space. A relatively high product of the field intensities, thus, is thereby obtained in the investigation zone, while the product is low outside the investigation zone.

At a cash desk in a self-service shop, for example, where the customer passageway can have a width of 70 cm, goods and other articles passing on the conveyor belt of the cash desk and provided with a strip must not cause indication of such a strip. By positioning a coil on each side of the monitoring zone, indication of such a strip on the conveyor belt is prevented.

This advantageous arrangement is utilized also at the method and system according to the present invention.

BRIEF DESCRIPTION OF DRAWINGS

The present invention is described in greater detail in the following, with reference to an embodiment thereof shown in the accompanying drawing, in which FIG. 1 schematically shows a system according to the invention.

DESCRIPTION OF PREFERRED EMBODIMENTS

Figure 1:
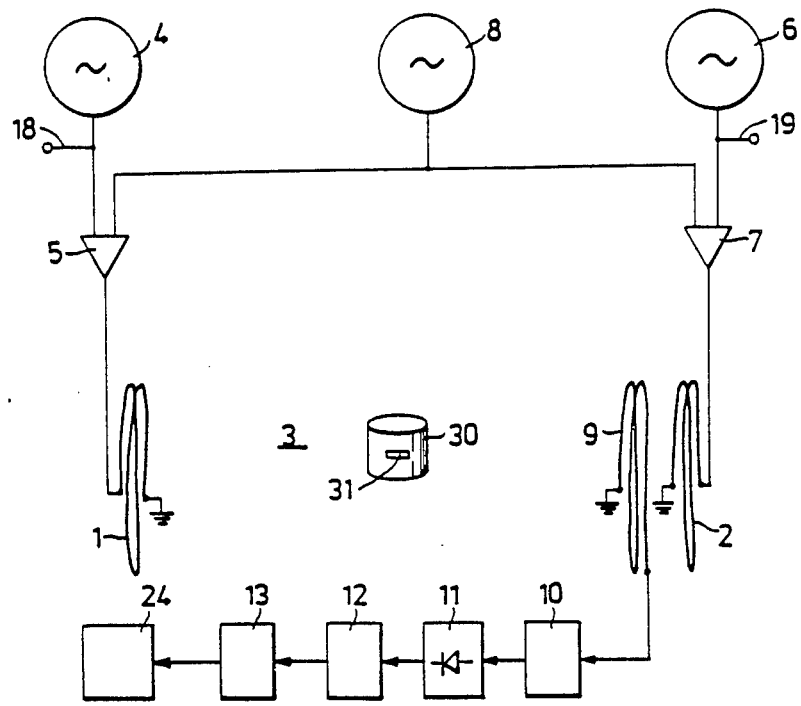

In FIG. 1 an embodiment of the invention is shown. The system according to FIG. 1 comprises coils 1,2 for emitting an electromagnetic alternating field on each side of the investigation zone 3. One of said coils 1 is fed with an alternating current with the frequency $f_1$ from a feeding device comprising a first oscillator 4 and a summation amplifier 5. The second one of the coils 2 is fed with an alternating current with the frequency $f_2$ from a second oscillator 6 and summation amplifier 7 associated with said feeding device. The feeding device further comprises a third oscillator 8 capable to generate an alternating voltage with the frequency $f_3$. Said third oscillator is connected to said two summation amplifiers 5,7, which are capable to emit an alternating current consisting of the frequency $f_1$ superposed on the frequency $f_3$ in the coil 1 and to emit an alternating current consisting of the frequency $f_2$ superposed on the frequency $f_3$ in the coil 2.

When using a strip of a highly permeable material, which also is long in relation to its cross-sectional area, only a relatively weak field intensity is required. The diameter of the coils can be varied within relatively wide limits, but should be of the same magnitude as the distance between them, i.e. for a normal cash desk in a self-service shop about 70 cm.

The two coils 1,2 shall be positioned so that the alternating fields emitted by the coils are substantially in parallel in every point in the monitoring zone 3.

One problem in monitoring of the kind referred to by the present invention is related to the fact, that the system does not scan strips oriented perpendicularly to the field lines. In order to obtain one hundred percent detection, three coil pairs can be arranged in such a way, that the fields generated by the respective coil pair are substantially perpendicular to each other. Thereby one coil pair at a time can be activated. When the shifting between the coil pairs is carried out sufficiently rapidly, a strip being moved through the investigation zone will be detected irrespective of its orientation.

In FIG. 1 an article 30 is shown provided with an indicating device 31 in the form of a strip of a highly permeable material.

In order, on one hand, to obtain a sufficiently high energy content in a signal originating from a magnetic field re-emitted from the strip and received by means of a receiver coil 9, the frequencies $f_1$ and $f_2$ must be relatively high. In order, on the other hand, to prevent the magnetic fields from being screened by objects in the investigation zone, the frequencies $f_1$ and $f_2$ must be chosen low. The higher frequencies $f_1$ and $f_2$, therefore, shall be lower than about 5 kc/s and higher than about 1 kc/s.

As mentioned above, at the present invention the art described in the aforementioned Swedish patent is utilized, which means that the non-linear properties of the strip are utilized for generating sum and difference frequencies of the frequencies $f_1$ and $f_2$.

According to one embodiment of the invention, the difference frequency and sum frequency of at least the first order are analysed. These are preferably of the same magnitude.

The frequencies $f_1$ and $f_2$, therefore, preferably can be such that $f_1$ is 1.5 kc/s and $F_2$ is 2.5 kc/s, in which case the sum frequency is 4 kc/s and the difference frequency is 1 kc/s.

When only the frequencies $f_1$ and $f_2$ are emitted and caused to form intermodulation products, which are detected, there is, as mentioned above, no possibility of directly deciding whether an intermodulation product was generated by a strip or by a ferromagnetic object, such as a sheet metal tin, with much greater mass and a slightly curved magnetization curve. It is in this case necessary to compare intermodulation products of different orders for distinguishing the strip from tin. This requires a relatively complicated and relatively expensive signal processing equipment.

A suitable field intensity for goods monitoring systems of the kind here concerned is approximately a magnitude of 1 gauss. Fields of this magnetude are not sufficient for saturating a sheet metal tin or other ferromagnetic objects normally occurring in the investigation zone, for example customer trolleys spectacle metal frames and other personal objects. A field of such an intensity, however, is fully sufficient for saturating a strip of said type.

According to the present invention, a strip can be distinguished from a sheet metal tin a way which is much simpler and safer than by utilizing only two frequencies. According to the present invention, as mentioned above, a third magnetic alternating field is generated, which varies with a frequency substantially lower than said higher frequencies $f_1$ and $f_2$. The frequency of said low-frequency field is lower than about 100 c/s, preferably about 25 c/s. A suitable frequency is, for example, 20 c/s. This field has a field intensity sufficiently high for, independently of the field with the frequencies $f_1$ and $f_2$, together with static fields, for example the earth's magnetic field, to put the strip into saturated condition in both directions. The low-frequency field preferably is caused to have an intensity exceeding the total intensity of the high-frequency fields by a factor of 2 to 6, preferably by a factor of 4.

When only the two frequencies $f_1$ and $f_2$ are utilized, as in the aforesaid patent, the field composed of $f_1$ and $f_2$ oscillates about an operating point on the magnetization curve of a strip. This continously gives rise to intermodulation products.

By moving, according to the present invention, said operating point with the frequency $f_3$ by means of the low-frequency field, a shower of intermodulation products is obtained for every half-cycle of $f_3$. Intermodulation products, thus, will be formed and re-emitted by the strip during the periods of time when the strip is not maintained saturated by the low-frequency field.

A ferromagnetic object, such as a sheet metal tin, certainly generates intermodulation products between the frequencies $f_1$ and $f_2$, but these products are generated continuously. The intensity of the low-frequency field is substantially lower than the intensity required for saturating, for example, a sheet metal tin. For this reason, the intensity of the signal received, which originates from intermodulation in a sheet metal tin, is substantially independent of the low-frequency field, because this moves the operating point only insignificantly along the magnetization curve of a sheet metal tin.

According to said patent, a suitable intensity for the magnetic fields emitted is, for example, at maximum 5 gauss, in order to ensure that the composite field runs through the non-linear part of the magnetization curve of the indicating device.

By applying, according to the present invention, a field with 20 c/s and with a lowest intensity of about 1 gauss in the investigation zone, it is ensured that the said operating point for the two high-frequency fields runs through the non-linear part of the magnetization curve of the indicating device 40 times/second. It is hereby sufficient that the intensity of the high-frequency fields is about one fourth of the intensity of the low-frequency field. Due to the emitting of the low-frequency field from two sides, the coils generating the field can be designed to be cheaper than in the case when the low-frequency field is emitted from only one side of the investigation zone.

For distinguishing a strip from a sheet metal tin it is, thus, only necessary to study the cyclical variation in the signal received which originates from the influence of the low-frequency field on the strip, i.e. said pulses.

At a simpler embodiment of the invention, it is, thus, sufficient by means of a detector device comprising an amplitude detector to amplitude detect the signal received at a frequency, for example $f_1+f_2$, and thereby to state in the detected signal whether or not pulses occur with a repetition frequency corresponding to the double frequency $f_3$.

The said amplitude detecting is carried out in an amplitude detector which can be of a design known per se.

The system shown in FIG. 1, for example, includes a detector device comprising a band-pass filter 10 containing coils and capacitors, which filter at the frequencies stated above as examples lets pass 4 kc/s with, for example, a band-width of 500 c/s. After the band-pass filter 10 an amplitude detector 11 is provided, which comprises, for example, a diode. After the amplitude detector 11 a low-pass filter 12 is located, which comprises, for example, an RC-circuit where frequency components of 4 kc/s and higher are filtered off. The intermodulation products generated, for example, by a sheet metal tin after amplitude detection and low-pass filtering give rise to substantially a direct voltage and low frequencies, primarily 40 c/s of low amplitude. The intermodulation products generated by a strip occur as pulses.

Figure 2:
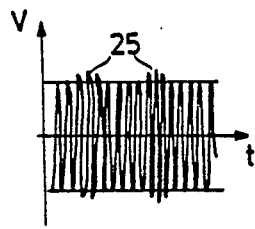
FIG. 2 shows the basic appearance of a signal received after a band-pass filtering in a voltage-time diagram.

After the band-pass filter 10, the signal originating from a tin and a strip has the appearance shown in principle in FIG. 2 with pulses 25. After the low-pass filter 12, the signal originating from a tin and a strip has the appearance shown in principle in FIG. 3, with pulses 25. In FIG. 4 the basic appearance of a signal is shown which originates only from a strip, after the low-pass filter 12.

Figure 3:
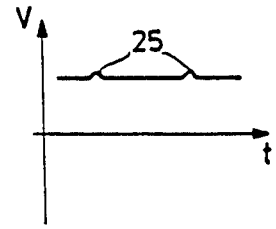
FIG. 3 shows the basic appearance of a signal received after band-pass filtering, amplitude detection inclusive of a low-pass filtering in a voltage-time diagram where the signal received originates from the influence of an indicating device and of another ferromagnetic object, such as a sheet metal tin.
Figure 4:
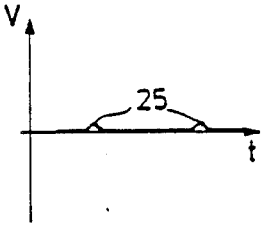
FIG. 4 shows the basic appearance of a signal received after the processing described above for FIG. 3 in a voltage-time diagram, but where the signal originates only from an indicating device.

When both a sheet metal tin and a strip are present in the investigation zone, thus, after the low-pass filtering a signal occurs where said pulses originating from the strip lie above the level originating from the sheet metal tin, see FIG. 3.

As mentioned above, it is, thus, by means of the present invention in its simplest embodiment sufficient, in a pulse detector 13 of known kind to detect the possible occurrence of pulses in order thereby to detect the possible occurrence of a strip in the investigation zone. It is thereby preferably detected that pulses occur 40 times/second in order to eliminate the influence of interferences on the detecting result. When such pulses are detected, an indicating device is regarded to be present in the investigation zone. The pulse detector 13 is capable to emit a signal to an alarm device 24 of expedient design.

The low frequency $f_3$ is chosen sufficiently low, so that the pulses which can pass the band-pass filter 10 shall be short compared with the cycle time for the low frequency. When the band-width of the band-pass filter is 500 c/s, a suitable frequency $f_3$, therefore, is about 20 c/s.

The low frequency $f_3$, however, is to be chosen sufficiently high for rendering it possible within reasonable time to generate a sufficient number of pulses for detecting and evaluation. A suitable number of pulses for detecting can be four. When three transmitter and receiver systems are provided for scanning an investigation zone in three directions perpendicular to each other, shifting between the different transmitter and receiver systems can be effected, for example, 5 times/second. Hereby, thus, a frequency $f_3$ of 20 c/s is suitable. However, other suitable frequencies than the ones stated above can be chosen for the frequency $f_3$ as well as for the frequencies $f_1$ and $f_2$.

According to a preferred embodiment, however, the signal is analised more accurately, compared with only detecting the number of pulses. According to this embodiment, the sum frequency and/or difference frequency are analysed in respect of both phase position relative to the magnetic field emitted originally and amplitude.

When, however, only the presence of pulses is detected, the frequencies $f_1, f_2$ and $f_3$ must be increased compared with the values stated above in order to obtain more pulses per second and thereby to obtain greater safety against interferences.

According to this embodiment, the signal received by means of the receiver coil 9 which is a measuring signal, is band-pass filtered about at least one of the difference of sum frequencies formed by the intermodulation. A reference signal with the same frequency is formed by mixing the high-frequency ($f_1, f_2$) signals generated for emitting the high-frequency fields. The measuring signal and the reference signal thus formed are applied on a phase and amplitude detector, preferably a quadrature detector, which is capable in a manner known per se to emit a signal corresponding to the amplitude (A) of said pulses and the phase difference ($\phi$) between the measuring signal and reference signal.

Figure 5:
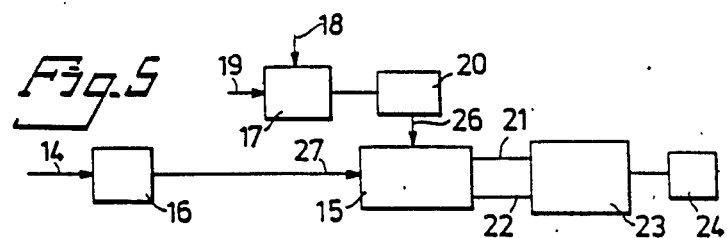
FIG. 5 shows an alternative detector device according to the invention.

A detector device for carrying out a method according to this embodiment is described below with reference to FIG. 5.

The detector device comprises a means, for example a mixer 17 capable to form a reference signal consisting of at least one difference or sum frequency for the frequencies $f_1$ and $f_2$. The mixer is fed via conductors 18 and, respectively, 19 from the first oscillator 4 and, respectively, second oscillator 6.

A band-pass filter 20 is provided to select only the elected difference or sum frequency, which for example can be 4 kc/s. This reference signal is applied on one input 26 of a quadrature detector 15.

A signal received from the receiver coil 14, i.e. the measuring signal, is passed via a band-pass filter 16, which filters out the said difference or sum frequency, which is equal to the frequency of the reference signal. The band-pass filter 4, thus, is tuned, for example, for 4 kc/c with a band-width of 500 c/s. After the band-pass filtering the measuring signal is applied to the second input 27 of the quadrature detector.

The quadrature detector 15 is designed in known manner and comprises two mixers, which mix the measuring signal with the reference signal.

In one mixer the reference signal, which has the phase angle $\phi_R$, is mixed with the measuring signal, which has the phase angle $\phi_M$. Prior to the second mixer, the measuring and/or reference signal is dephased so that the difference between their phases is $\phi_R - \phi_M + 90°$ or $\phi_R - \phi_M - 90°$. The quadrature detector 15 also comprises a low-pass filter for filtering off frequencies 4 kc/s and higher. The low-frequency pulses obtained out of the quadrature detector 15 contain information on phase and amplitude of the pulses of intermodulation products.

The quadrature detector 15 is capable to emit a signal in two channels 21,22 where in one channel the signal corresponds to A·sin $\phi$ where A is the amplitude of the measuring signal and $\phi$ is $\phi_R - \phi_M$ and where in the second channel the signal correspond to A·cos $\phi$. In a microprocessor, for example, of suitable kind, 23, two or more pulses occurring on each other in the channels 21 and 22 are compared in respect of A and $\phi$. When there is a pre-determined degree of similarity in respect of A and $\phi$ between two or more subsequently occurring pulses, a strip is regarded to be present in the investigation zone. The microprocessor 23 is capable to emit a signal to an expedient alarm device 24.

In order to increase additionally the safety of the detecting system, the duration of the 20 c/s signal can be measured by known means and fed to the microprocessor 23. Said microprocessor 23 is capable to evaluate whether the pulses occur in step with the 20 c/s signal. The influence of possible other external varying magnetic fields or other interferences is hereby suppressed.

The said microprocessor 23 and associated circuits for analysing the amplitude A and phase angle $\phi$ are of a suitable known type and are per se not comprised in the present invention. They are, therefore, not described here in detail.

Quadrature detecting of the sum frequency has been described above. Instead, of course, the difference frequency 1 kc/s can be dealt with as well as both the difference and sum frequencies. In the lastmentioned case, of course, an additionally increased safety in the analysis of a signal received is obtained.

In addition to the aforesaid sum and difference frequencies, at the intermodulation a great number of frequencies $n \cdot f_1 + m \cdot f_2$ are generated where n and m are positive or negative integers. By analysing more than one or two of these frequencies, of course, the sensitivity of the system is increased additionally.

All frequencies $f_1$, $f_2$ and $f_3$ advantageously can be obtained by frequency division from a common oscillator (not shown). It is thereby simple also to form four-phase signal for use at the aforesaid quadrature detection.

It is obvious that the present invention eliminates the disadvantages mentioned above in the introductory part. The present invention, thus, yields primarily the advantage that from a signal received an indicating device easily and safely can be distinguished from, for example, a sheet metal tin or other object of magnetic material in the investigation zone. As mentioned above, the high-frequency fields can be made weaker than is the case at known art where an additional low-frequency field is not utilized. Due to the possibility of reducing the intensity of the high-frequency fields, the characteristic of the signal received increases. This, in combination with the greater capacity of distinguishing a strip from a sheet metal tin by applying a third field, can be utilized in such a way, that the indicating device is designed smaller. To design the indicating device, i.e. the strip, smaller than usual is especially advantageous in cases when the strip shall be integrated with a price label.

The present invention, thus, is especially advantageous for such application.

Different embodiments have been described above. The invention, however, can be varied without abandoning the invention idea. The number of coils, for example, for emitting the high-frequency and the low-frequency field can be varied, and also the method and the means for generating desired fields can be varied. It also is possible to provide several receiver coils.

The invention, thus, shall not be regarded restricted to the embodiments set forth above, but can be varied within the scope of the attached claims.

I claim:

1. A method of detecting the presence of an indicating device in a restricted investigation zone, comprising the steps of detecting an indicating device (31) of a highly permeable material by emitting and receiving a magnetic field, wherein two coils (1,2) are caused to emit a high-frequency magnetic alternating field, and a first one of the coils (1) emits an alternating field with a frequency ($f_1$) differing from the frequency ($f_2$) of the field emitted by the second one of the coils (2), and at least one positive difference and/or positive sum frequency $n\cdot f_1 + m\cdot f_2$ occuring by intermodulation by means of the indicating device (31), where n and m are positive or negative integers, is caused to be received by one of several coils (9), characterized in that a third low-frequency magnetic alternating field is caused to be emitted into said zone with a frequency ($f_3$) on the order of ten to fifty times lower than said frequencies ($f_1$, $f_2$) which low-frequency field is caused to have a field intensity sufficiently high, independently of the fields with the frequencies $f_1$ and $f_2$ to put the indicating device (31) into a saturated condition in step with the frequency of the low-frequency field, and a field re-emitted from the indicating device (31) is caused to be detected by means of a detector device as an intermodulation between the frequencies $f_1$ and $f_2$, which occurs periodically with the frequency of the low-frequency field.

2. A method as defined in claim 1 characterized in that the frequency ($f_1$, $f_2$) of the high-frequency fields is lower than about 5 kc/s and higher than about 1 kc/s.

3. A method as defined in claim 1, characterized in that the frequency ($f_3$) of the low-frequency field is lower than about 100 c/s, preferably about 25 c/s.

4. A method as defined in claim 1, characterized in that the field intensity of the low-frequency field exceeds the total intensity of the high-frequency fields by a factor of 2 to 6, preferably by a factor of 4.

5. A method as defined in claim 1, characterized in that a signal received by means of a receiver coil (9) is band-pass filtered by about at least one of the difference or sum frequencies formed by the intermodulation and amplitude detected, whereby the occurrence of an indicating device (31) is detected as the occurrence of pulses with a repetition frequency corresponding to twice the frequency ($f_3$) of the low-frequency field of the amplitude detected signal.

6. A method as defined in claim 1, characterized in that the signal detected, the measuring signal, is band-pass filtered about at least one of the difference or sum frequencies formed by the intermodulation, and that a reference signal with the same frequency is formed by mixing the high-frequency ($f_1$, $f_2$) signals generated for emitting the high-frequency fields, and that the measuring signal and the reference signal thus formed are applied to a phase and amplitude detector (15) capable of emitting a signal corresponding to the amplitude (A) of said signals and the phase difference ($\phi$) between the measuring signal and reference signal.

7. Apparatus for detecting the presence of an indicating device in a restricted investigation zone, comprising coils (1,2) and associated feeding equipment for emitting and receiving magnetic alternating fields and thereby detecting an indicating device (31) of a preferably highly permeable material, wherein two coils (1,2) are provided, one (1) of which is capable of emitting a high-frequency alternating field with a frequency ($f_1$) and a second one (2) of the coils is capable of emitting a high-frequency alternating field with a frequency ($f_2$) differing from said first mentioned frequency, and a detector device including a receiver coil capable of detecting the occurrence of at least one positive difference of positive sum frequency $n\cdot f_1 + m\cdot f_2$, where n and m are positive or negative integers, which are formed by intermodulation by means of said indicating device (31), characterized in that the feeding equipment (4-8) comprises means for emitting a third alternating field, which has a low frequency with a frequency ($f_3$) substantially lower than said frequencies ($f_1$, $f_2$), which means are capable of emitting the low-frequency field with a field intensity sufficiently high, independently of the fields with the frequencies $f_1$ and $f_2$ to put the indicating device (31) into saturated condition in step with the frequency ($f_3$) of the low-frequency field, and the detector device (10-13;15-23) is capable by means of a receiver coil (9) of receiving and thereby detecting a field re-emitted by the indicating device (31), which comprises an intermodulation between the frequencies $f_1$ and $f_2$ occurring periodically with the frequency ($f_3$) of the low-frequency field, and at the occurrence of such a periodically occurring intermodulation to emit a signal to an alarm device.

8. Apparatus as defined in claim 7, characterized in that said two coils (1,2) are located one on each side of said monitoring zone.

9. Apparatus as defined in claim 7 or 8, characterized in that said feeding equipment (4-8) is capable of emitting the low-frequency alternating field by means of both coils (1,2).

10. Apparatus as defined in claim 7 characterized in that the higher frequencies $f_1$ and $f_2$ are lower than about 5 kc/s and higher than about 1 kc/s.

11. Apparatus as defined in claim 7 characterized in that the frequency $f_3$ of the low-frequency field is lower than about 100 c/s, preferably about 25 c/s.

12. Apparatus as defined in claim 7, characterized in that the feeding equipment (4-8) is capable of emitting the low-frequency field with an intensity exceeding the total intensity of the high-frequency fields by a factor of 2 to 6, preferably by a factor of 4.

13. Apparatus as defined in claim 7, characterized in that the detector device (10-13) comprises a band-pass filter (16) for filtering out said difference or sum frequency of a signal received, and an amplitude detector (11,12), which detector device is capable of detecting the occurrence of pulses, which occur with a repetition frequency corresponding to twice the frequency of the low-frequency field, at the amplitude detected signal.

14. Apparatus as defined in claim 7, characterized in that the detector device (15-23) comprises a reference signal means for forming a reference signal consisting of at least one difference or sum frequency to the frequencies $f_1$ and $f_2$, and a band-pass filter (16) for filtering out said difference or sum frequency of a signal received, which filtered-out signal is a measuring signal, and a phase and amplitude detector (15) capable of receiving said reference signal and measuring signal and of emitting a signal corresponding to the amplitude (A) of said signals and the phase difference ($\phi$) between the measuring signal and reference signal.

* * * * *